(12) United States Patent
Okumura

(10) Patent No.: US 6,386,020 B1
(45) Date of Patent: May 14, 2002

(54) ROTARY SENSOR CAPABLE OF HIGH-PRECISION DETECTION OF ROTATION ANGLE TRANSMITTED FROM OUTSIDE

(75) Inventor: Hirofumi Okumura, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/390,463

(22) Filed: Sep. 7, 1999

(30) Foreign Application Priority Data

Sep. 8, 1998 (JP) .......................................... 10-253609

(51) Int. Cl.[7] .............................................. G01M 15/00
(52) U.S. Cl. ...................................................... 73/118.1
(58) Field of Search ..................... 73/118.1; 324/207.25, 324/173, 174; 338/13, 118, 160–162, 166, 167

(56) References Cited

U.S. PATENT DOCUMENTS 4,961,342 A * 10/1990 Matsumoto et al. ....... 73/118.1

5,567,874 A   10/1996 Suzuki et al.
5,571,960 A   11/1996 Tateishi et al.

FOREIGN PATENT DOCUMENTS

DE   36 43 255 A1   6/1988
DE   41 41 822 A1   6/1993
DE   44 31 455 A1   3/1996

* cited by examiner

*Primary Examiner*—Robert Raevis
(74) *Attorney, Agent, or Firm*—Brinks Hofer Gilson & Lione

(57) ABSTRACT

Disclosed is a rotary sensor, in which an engagement portion and a shaft portion are projectively formed on one side and on the other side respectively on the center of rotation of a rotator. The shaft portion is supported by a support portion on the bottom plate. And the engagement portion is movably supported on the support portion as a support point so as to be movable in an arbitrary direction orthogonal to the axial direction of the drive shaft.

6 Claims, 4 Drawing Sheets

ROTARY SENSOR CAPABLE OF HIGH-PRECISION DETECTION OF ROTATION ANGLE TRANSMITTED FROM OUTSIDE

BACKGROUND OF THE INVENTION

1. Field of the Invention

This invention relates to a rotary sensor and more particularly to a rotary sensor capable of detecting with high precision a rotation angle transmitted from outside.

2. Description of Related Art

A conventional rotary sensor has an approximately cylindrical housing 1 outside as shown in FIG. 6, and is provided with a case 2 having a hollow portion 2a inside, and a cover 3 securely attached on the case 2 to cover the hollow portion 2a.

In the cover 3 a shaft hole 3a is formed. In the hollow portion 2a is housed a rotator 4 with an operating shaft 4a formed on the center of rotation. The operating shaft 4a is rotatably inserted into the shaft hole 3a of the cover 3, projecting out of the cover 3.

The shaft hole 3a is formed larger in diameter than the operating shaft 4a, so that the operating shaft 4a will be inserted loose-fit in the shaft hole 3a.

On the center of rotation of the forward end of the operating shaft 4a there is formed, for instance, an oval engagement hole 4b, in which a later-described drive shaft 8 is inserted.

On the inside surface on the hollow portion 2a side of the cover 2, a resistor board 5 is attached. On the surface of this resistor board 5 an approximately horseshoe type resistor pattern (not depicted) is formed by printing. The resistor pattern is in contact with a wiper contact 6 attached on the rotator 4, so that the wiper contact 6 will slide on the resistor pattern with the rotation of the rotator 4, changing the value of resistance along a predetermined curve.

On the lower side of the resistor board 5 shown, a plurality of terminals 7 are attached by caulking in connection with the resistor pattern.

To detect the rotation angle of, for instance, an automotive throttle valve by the use of such a conventional rotary sensor, the cover 3 of the housing 1 is attached to a specific mounting member not shown. At this time, the drive shaft 8 (indicated by a two-dot chain line), which is connected with the rotating shaft of the throttle valve on the automobile side, is inserted into engagement with the engagement hole 4b of the operating shaft 4a.

The forward end of the drive shaft 8 is ground into an oval form, and pressed into the oval engagement hole 4b of the operating shaft 4a to thereby transmit the rotation of the drive shaft 8 to the rotator 4.

The above described drive shaft 8 is loose or eccentric in both the thrust direction which is an axial direction and the radial direction intersecting the axial direction at right angles because of assembly requirements of components on the throttle valve side. It has become necessary to absorb this looseness or eccentricity of the drive shaft 8 on the rotary sensor side.

The looseness of the drive shaft 8 is absorbed by using the shaft hole 3a in the bottom plate 3 which is formed larger in diameter than the operating shaft 4a of the rotator 4. Thus, the rotator 4 can rotate smoothly without the operating shaft 4a interferring with the shaft hole 3a in case the drive shaft 8 is loose or eccentric in the radial direction.

The aforesaid conventional rotary sensor is of such a design that when the drive shaft 8 connected with the rotating shaft of the throttle valve rotates through a specific angle, the rotator 4 also rotates smoothly and accordingly the wiper contact 6 slides on the resistor pattern, changing the value of resistance. The amount of change of the resistance value is detected by a control section (not depicted), whereby the rotation angle of the drive shaft 8 can be detected.

The aforesaid rotary sensor, however, has the following problem: the operating shaft 4a of the rotator 4 is installed directly on the drive shaft 8 which is loose or eccentric in the thrust or radial direction; therefore with the rotation of the drive shaft 8, the rotator 4 also rotates with looseness or eccentricity in accordance with the looseness or eccentricity of the drive shaft 8. This results in deviation in the path of the wiper contact 6 relative to the resistor pattern and consequently in a failure in high-precision detection of the rotation angle.

As another method for eliminating the effect of looseness of the drive shaft 8, the drive shaft 8 and the operating shaft 4a contact on only one side in the direction of rotation to transmit the unidirectional rotation of the drive shaft 8 to the rotator 4; and with the rotation of the drive shaft 8 in another direction, the rotator 4 is driven by the force of a return spring or other mechanism, to follow the rotation of the drive shaft 8, thereby operating the drive shaft 8 and the operating shaft 4a as one body. According to this method, however, a component part such as the return spring is needed, which will increase the number of components and accordingly result in an increased cost.

SUMMARY OF THE INVENTION

It is, therefore, an object of this invention to provide a rotary sensor which can solve the above-described problems, enabling high-precision detection of the rotation angle by absorbing looseness or eccentricity of the drive shaft 8.

As the first arrangement to solve the aforementioned problems, the rotary sensor of this invention is provided with a rotator having an engagement portion with which the drive shaft is engaged, a housing rotatably supporting the rotator between top and bottom plates, and an angle sensing member for detecting the rotation angle of the rotator. The rotator has on the center of rotation an engagement portion and a shaft portion which are projectively formed on one and the other sides of the rotator; the shaft portion being supported with a support portion formed on the bottom plate and the engagement portion being so supported as to be tiltable in an arbitrary direction orthogonal to the axial direction of the support portion.

As the second arrangement to solve the aforementioned problems, a gap is formed between the top plate and the rotator, and an elastic member is inserted in this gap to support the shaft portion of the rotator in elastic contact with the support portion.

Furthermore, as the third arrangement to solve the aforementioned problems, the elastic member is made of a ring-shaped plate comprising a plurality of elastic contact portions which are partly curved in a wave form. The rotator is in elastic contact at these elastic contact portions.

Furthermore, as the fourth arrangement to solve the aforementioned problems, the rotary sensor is constituted as described below. The angle sensing member has a wiper contact and a resistor; the engagement portion stated above has a slot extending in a direction orthogonal to the axial direction of the drive shaft; and a flat plate-shaped projection is formed on the center of rotation on the forward end of the drive shaft and engaged with the slot. And the wiper contact is mounted in a position approximately orthogonal to the slot direction of the slot of the rotator.

The foregoing object and other objects will become more apparent and understandable from the following detailed description thereof, when read in connection with the accompanying drawings.

DESCRIPTION OF THE PREFERRED EMBODIMENTS

Figure 1:
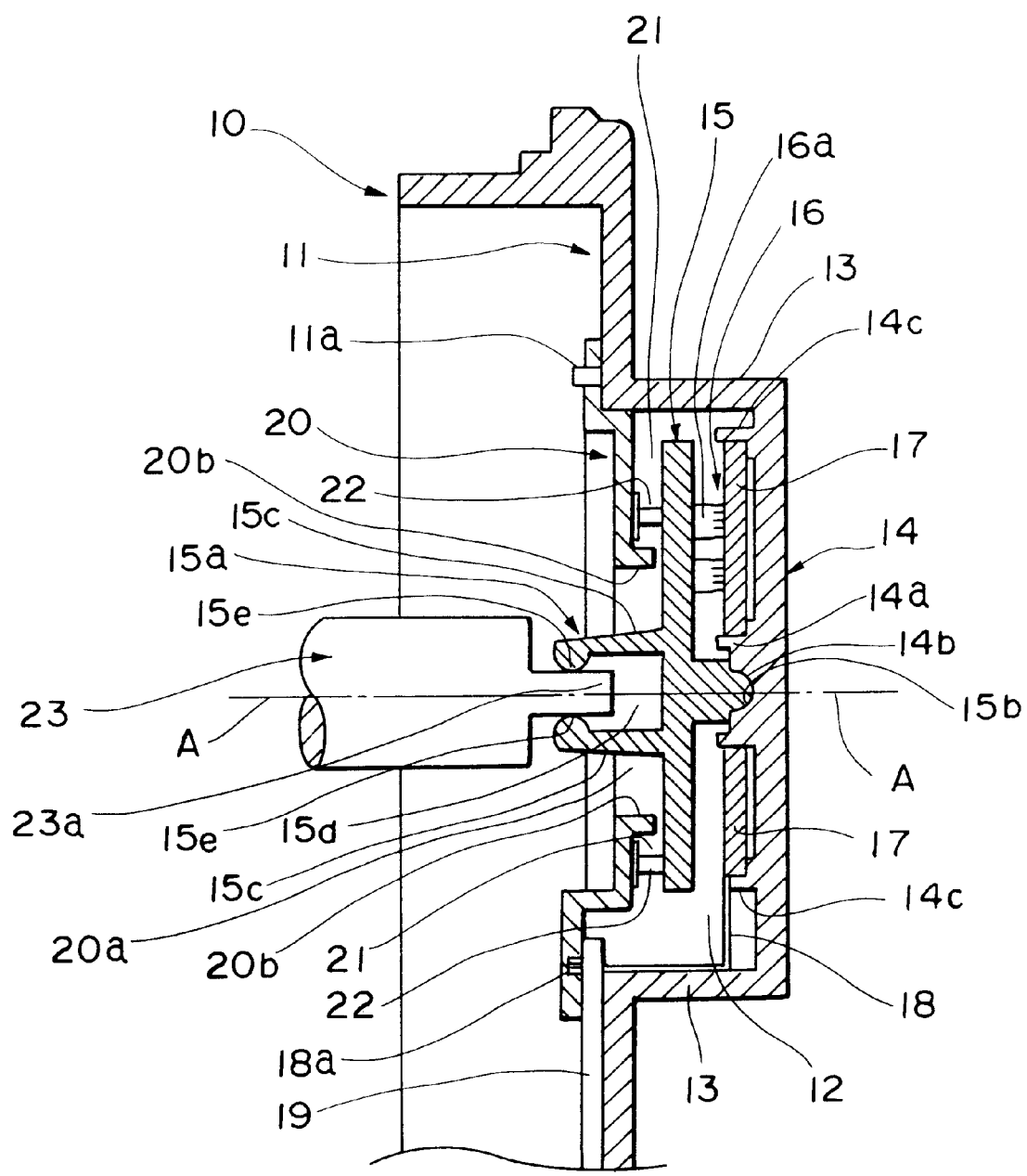
FIG. 1 is a sectional side view showing a major portion of a rotary sensor of this invention.
Figure 2:
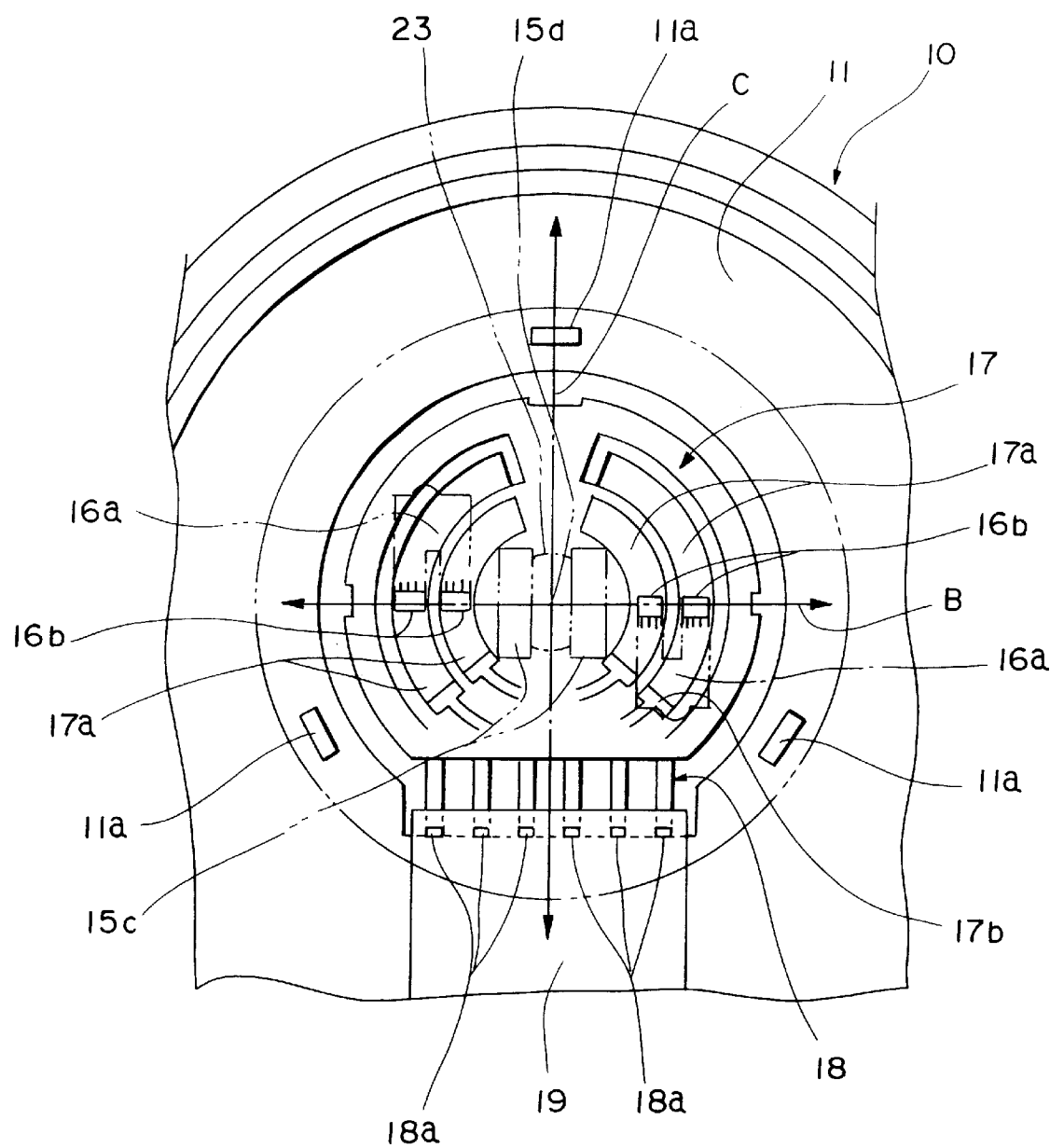
FIG. 2 is a schematic plan view explaining a relationship of major components of this invention.
Figure 3A:
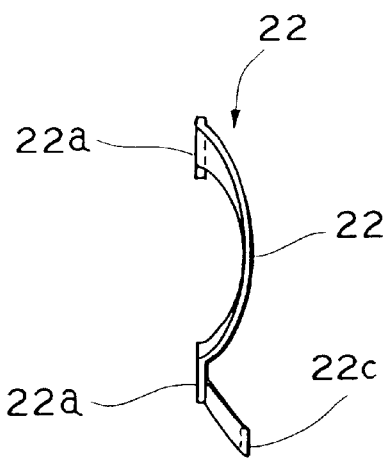
FIG. 3A is a side view of an elastic member of this invention.
Figure 3B:
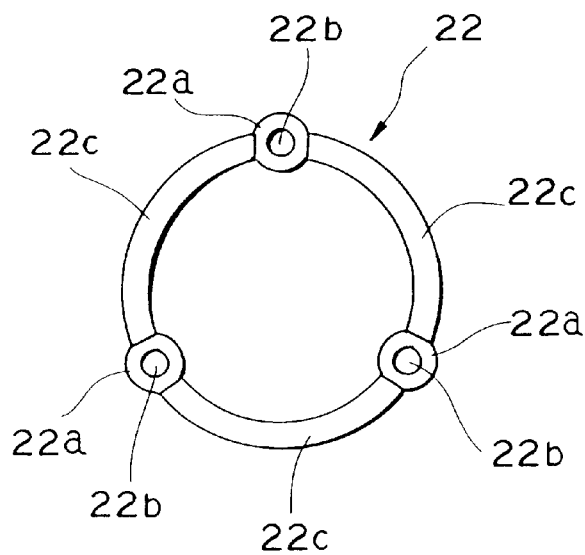
FIG. 3B is a front view of the same.
Figures 4A, 4B:
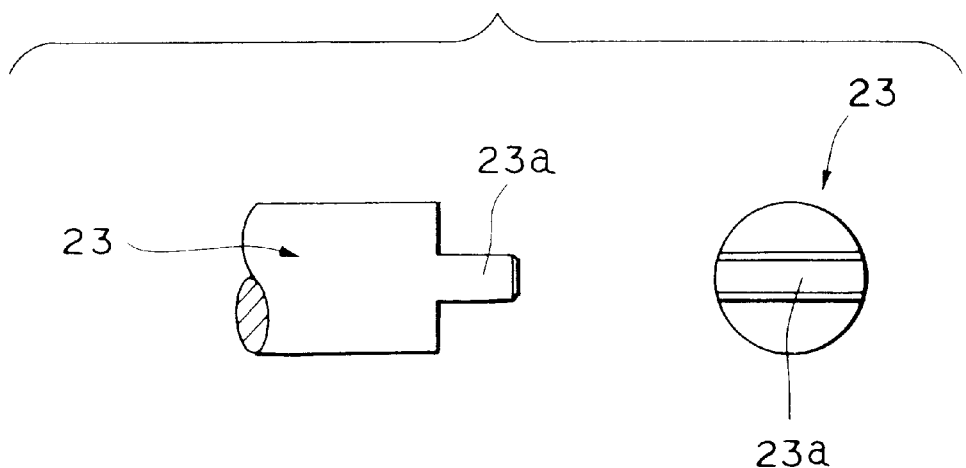
FIG. 4 gives side and front views showing a major portion of a drive shaft of this invention.
Figure 5:
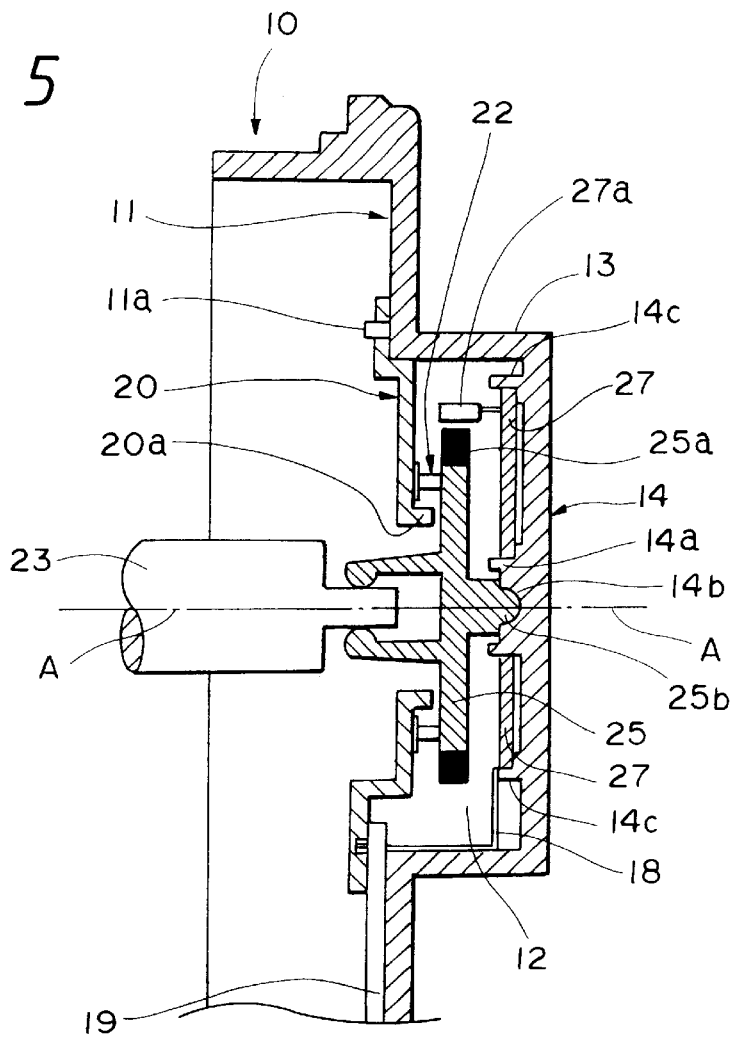
FIG. 5 is a sectional side view of a major portion explaining another embodiment of this invention.
Figure 6:
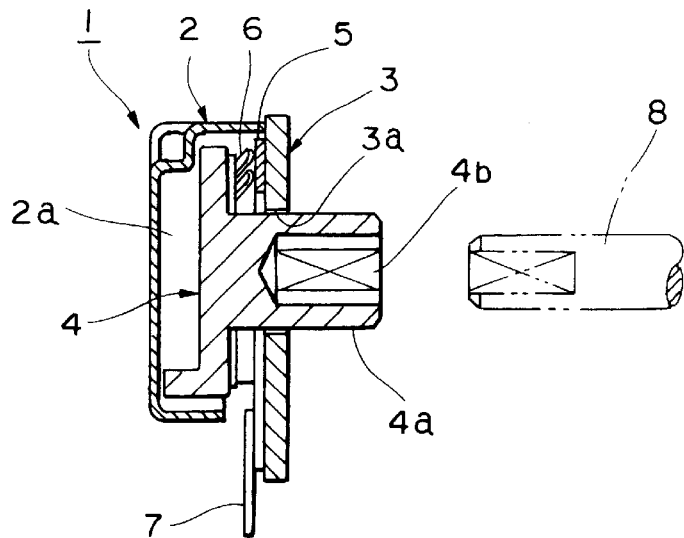
FIG. 6 is a sectional side view showing a major portion of a conventional rotary sensor.

One embodiment of a rotary sensor of this invention will hereinafter be described with reference to the accompanying drawings. FIG. 1 is a sectional view showing a major portion of the rotary sensor of this invention; FIG. 2 is a schematic plan view explaining the relation of major portions of this invention; FIGS. 3A and 3B are views of an elastic member of this invention; FIG. 4 is a schematic view of a drive shaft of this invention; and FIG. 5 is a sectional view of a major portion explaining another embodiment of this invention.

The rotary sensor of this invention has a housing 10 of a box shape (not shown) produced of a resin material as shown in FIG. 1. This housing 10 is shielded at the bottom portion with a bottom wall 11. The bottom wall 11 is partly protruded to the right side in the drawing, forming an approximately cylindrical housing section 12. This housing section 12 is comprised of a surrounding side wall 13 and a bottom plate 14 of the bottom portion.

At about the central part of the bottom plate 14 there is formed a support portion 14a projecting leftwardly in the drawing on the housing section 12 side. At the central part of this support portion 14a a semispherical bearing portion 14b consisting of a recess is formed.

Near the side wall 13, inside the housing section 12 of the bottom plate 14, there is projectively formed a board holding portion 14c for mounting a later-described resistor board 17.

Rotatably housed in the housing section 12 is an approximately disk-shaped rotator 15 produced of a resin material. The rotator 15 has an engagement portion 15a and a shaft portion 15b formed projecting on one side, or the left side in the drawing, and on the other side, or the right side in the drawing, of the centerline A which is the center of rotation of the rotator 15, to thereby support the shaft portion 15b by the support portion 14a formed on the bottom plate 14.

The engagement portion 15a has two engagement walls 15c, 15c projectively formed on both sides of the centerline A; between these two engagement walls 15c, 15c, a slot 15d of a specific width is formed extending in a direction orthogonal to the centerline A.

On the tip of either of the engagement walls 15c, 15c is formed an approximately semicircular projection 15e, which projects on the slot 15d side.

The projecting end of the shaft portion 15b of the rotator 15 is formed in an approximately semispherical form. The shaft portion 15b is rotatably supported on the bearing portion 14b of the bottom plate 14, and therefore is not movable in a direction orthogonal to the centerline A.

On the side surface of the rotator 15 where the shaft portion 15b is formed, a resilient wiper contact 16a is attached. The wiper contact 16a is a part of a component consisting of an angle sensing member 16.

On the wiper contact 16a, a contact portion 16b which slides in contact with a later-described resistor pattern and collector pattern 17a are attached in a position nearly orthogonal to the slot direction of the slot 15d in the rotator 15 as shown in FIG. 2.

A resistor board 17 is disposed, with a predetermined gap, on the opposite side of the surface on which the wiper contact 16a is attached. The resistor board 17 is positioned by the board holding portion 14c of the bottom plate 14 and fixedly attached by caulking or other means.

On the surface of the resistor board 17 the resistor pattern and collector pattern 17a are formed by printing as shown in FIG. 2; and the contact portion 16b of the wiper contact 16a is in elastic contact with the resistor pattern and collector pattern 17a. The angle sensing member 16 is comprised of the wiper contact 16a and the resistor board 17 having the resistor pattern 17a and collector pattern.

On the lower side of the resistor board 17 shown in FIG. 1, a plurality of approximately L-shaped terminals 18 are connected correspondingly to the resistor pattern and collector pattern 17a. The terminals 18 are led out from the end face of the resistor board 17 and held in contact with the inner surface of the side wall 13. In this state, an unillustrated lead pattern on FPC19 is connected by soldering or other to the forward end portion 18a led out to the left side in the drawing.

On the left side in the drawing of the rotator 15 an upper plate 20 is disposed to cover the housing section 12. The upper plate 20 is attached to mounting projections 11a formed in a plurality of positions on the bottom wall 11 and secured to the bottom wall 11 by thermal caulking or other means.

At the central part of the upper plate 20 is formed an opening 20a in which the engagement portion 15a of the rotator 15 is disposed. Around the opening 20a there is formed a support wall 20b formed in a cylindrical shape, projecting toward the rotator 15 inside. The support wall 20b serves to prevent the rotator 15 from tilting over a specific position.

There is formed a gap 21 between the upper plate 20 and the rotator 15. In the gap 21 an elastic member 22 is disposed. The elastic member 22 is a resilient ring-shaped plate material produced of a phosphor bronze plate or the like. As shown in FIG. 3, a flat mounting section 22a is formed in a plurality of ring-shaped positions and is provided with mounting holes 22b.

The elastic member 22 is curved to a wave form in a part of the ring-shaped plate material, to thereby form a plurality of elastic contact portions 22c. The mounting hole 22b is caulked to an unillustrated projection formed on the rotator 15 side, and the elastic member 22 is mounted on the inner surface of the upper plate 20. The spring pressure of the elastic portion 22c is set greater than that of the wiper contact 16a.

Since the plurality of elastic portions 22c of the elastic member 22 are constantly in elastic contact with the rotator 15, the rotator 15 is pressed against the bottom plate 14 side. In this state, therefore, the shaft portion 15b is supported on the bearing portion 14b of the support portion 14a and the rotation of a later-described drive shaft 23 is transmitted. The rotator 15 is rotatably supported within the housing section 12.

That is, the rotator 15 is inclinably supported so as to be inclined by the function of the elastic member 22, on the support of the support portion 14a, to any arbitrary direction orthogonal to the centerline A which is the center of rotation of the engagement portion 15a.

To detect the rotation angle of for instance a throttle valve on an automobile by the use of the rotary sensor of this invention of the above-described constitution, first the housing 10 is attached to the body of a throttle body (not depicted). Then, as shown in FIG. 1, the drive shaft 23 coupled to an unillustrated rotating shaft of the throttle valve is inserted and positioned in the slot 15d in the engagement portion 15a of the rotator 15.

The drive shaft 23 is formed in a shape of a round rod, on the forward end of which a flat plate-shaped projection 23a is formed on the centerline A which is the center of rotation. The drive shaft is designed to reciprocally rotate within a specific range of rotation angle.

With the projection 23a inserted in the slot 15d of the rotator 15, the drive shaft 23 engages with the engagement portion 15a, so that the rotator 15 can rotate with the rotation of the drive shaft 23.

When the angle sensor of this invention is used for instance as a throttle sensor, the angle sensing member 16 can detect the rotation angle up to the range of about 100 degrees. This range of detection of the rotation angle, however, varies with the type of a sensor; for example there is even an endless detection type.

The drive shaft 23 has looseness in the thrust direction which is an axial direction, or looseness or eccentricity in the radial direction which is an arbitrary direction orthogonal to the axial direction, for convenience of parts accuracy or other on the throttle valve side.

The rotary sensor of this invention is so designed as to be able to detect the rotation angle of the drive shaft 23 without error, or with little error if any, by absorbing a change in the thrust direction, and looseness or eccentricity in the radial direction, of the drive shaft 23.

That is, when the drive shaft 23 is displaced in the thrust direction because of the presence of looseness in the thrust direction, the slot 15d is formed deep enough to allow free movement of the projection 23a of the drive shaft 23 shown in FIG. 1 in the direction of the centerline A between the projections 15e, 15e of the engagement portion 15a, thereby enabling absorption of the displacement in the thrust direction.

Since the displacement in the thrust direction of the drive shaft 8 is absorbed, the wiper contact 16a will not change position in relation to the resistor pattern and collector pattern 17a, thus ensuring error-free, high-precision detection of the rotation angle of the drive shaft 23.

When the drive shaft 23 is off the center of rotation towards an arbitrary radial direction, the engagement portion 15a of the rotator 15 deviates with the radial eccentricity of the drive shaft 23. In this case, however, because the shaft portion 15b is supported by the support portion 14a of the bottom plate 14, the wiper contact 16a will hardly move off position in relation to the resistor pattern and collector pattern 17a. Since only the contact pressure slightly varies, it is possible to detect the rotation angle of the drive shaft 23 with little error and with high precision if the drive shaft 23 is radially loose or off center.

The relative displacement of the drive shaft 23 resulting from looseness or eccentricity in an arbitrary radial direction can be considered to be a resultant of looseness or eccentricity in two directions. In case there exists a radial displacement in the direction of the arrow B shown in FIG. 2, the rotator 15 shown in FIG. 1 slightly tilts on the support point of the support portion 14a, resulting in a slight change in the contact pressure in relation to the resistor pattern and collector pattern 17a of the wiper contact 16a. This slight change, however, will hardly give an effect to an output. The positions of the resistor pattern and collector pattern 17a are also changed slightly in the radial direction; however, since the distance from a support point in the direction of height to the support contact 16b is shorter than the distance from the support point to the projection 15e, the amount of movement of the contact portion 16b with respect to the amount of eccentricity of the drive shaft 23 can be decreased. In the present embodiment, it is possible to lessen the amount of movement of the contact portion 16b to about one-third of the amount of eccentricity of the drive shaft 23.

Furthermore, in the present embodiment, the contact portion 16b is set in a position approximately orthogonal to the slot direction of the slot 15b. Therefore, the drive shaft 23, if displaced in the direction of the arrow B, moves only in the direction of width of the resistor pattern and collector pattern 17a, and the distance between an electrode 17b and the contact portion 16b will not change and consequently the resistance value also will hardly vary.

When the drive shaft 23 is radially loose or eccentric in the direction of the arrow C in FIG. 2, the projection 23a of the drive shaft 23 just moves in the direction of the arrow C of the slot direction between the projections 15e, 15e of the engagement portion 15a, thus enabling to eliminate a radial effect in the direction of the arrow C. Therefore, if the drive shaft 23 is shifted radially in the direction of the arrow C, the rotation angle of the drive shaft 23 can be detected without error and with high accuracy.

In the present embodiment of this invention heretofore described, the angle sensing member 16 is comprised of the wiper contact 16a and the resistor board 17 having the resistor pattern 17a. The angle sensing member 26 may be comprised of a magnetic member 25a radially mounted in the circumferential direction on the outer periphery of the rotator 25 and a Hall IC 27a attached on the board 27 on the outside of the magnetic member 25a with a specific amount of gap provided therebetween.

In this case, if there exists radial looseness with the drive shaft 23, the gap between the magnetic member 25a and the Hall IC 27a varies to slightly change the value of output, resulting in an error. However, as the shaft portion 25b is supported by the support portion 14a, the error can be decreased.

The rotary sensor of this invention has an engagement portion and a shaft portion formed projecting on one and the other sides of the rotator, on the center of rotation of the rotator; the shaft portion being supported by the support portion formed on the bottom plate, and the engagement portion being supported so as to be inclinable in an arbitrary direction orthogonal to the axial direction of the drive shaft on the support point of the support portion. It is, therefore, possible to provide a rotary sensor in which the radial looseness of the drive shaft can be absorbed to allow high-precision detection of rotation angle.

Furthermore, there is formed a gap between the upper plate and the rotator. In this gap an elastic member is disposed to elastically support the shaft portion of the rotator with the support portion. The shaft portion of the rotator, therefore, can be rotatably supported reliably with the support portion of the bottom plate.

Furthermore, the elastic member is produced of a ring-shaped plate material, which is partly curved to a waved shape to form a plurality of elastic portions which are held in elastic contact with the rotator. It is, therefore, possible to uniformly apply the spring pressure of the elastic member to the disk-like rotator in order to ensure high-precision detection of rotation angle.

Furthermore, the angle sensing member has a wiper contact and a resistor. The engagement portion has a slot extending in a direction orthogonal to the axial direction of the drive shaft. A plate-shaped projection is formed at the forward end of the drive shaft, passing through the center of rotation; the projection being engaged with the slot. The wiper contact is disposed in a position approximately orthogonal to the slot direction of the groove portion of the rotator. Therefore looseness in the thrust direction of the drive shaft can reliably be absorbed. Furthermore, the radial looseness of the drive shaft in the slot direction of the slot can also be reliably absorbed by moving the drive shaft in the slot direction within the slot.

Furthermore, in the case of the radial looseness of the drive shaft present in a direction orthogonal to the slot direction of the slot, because the wiper contact moves in a direction orthogonal to the circumferential direction of the resistor pattern, a change in the resistor value can be reduced to minimize a detection error of the rotation angle.

What is claimed is:

1. A rotary sensor, comprising: a rotator having an engagement portion with which a drive shaft engages, a housing rotatably supporting said rotator between an upper plate and a bottom plate, and an angle sensing member for detecting the rotation angle of said rotator; said rotator having on the center of rotation an engagement portion and a shaft portion projectively formed on one and other sides of said rotator; said shaft portion being pivotally supported by a support portion formed on said bottom plate; and said rotator being inclinably supported in a direction where its rotator shaft is orthogonal to the axial direction of said drive shaft as said drive shaft is eccentrically shifted with said pivot support being applied as a fulcrum point.

2. A rotary sensor according to claim 1, wherein a gap is formed between said upper plate and said rotator; within said gap an elastic member is disposed to elastically support said shaft portion of said rotator in elastic contact with said support portion.

3. A rotary sensor according to claim 2, wherein said elastic member is produced of a ring-shaped plate material, which is partly curved into a wave shape to form a plurality of elastic contact portions, and is held at said elastic contact portion in elastic contact with said rotator.

4. A rotary sensor according to claim 1, wherein said angle sensing member is provided with a wiper contact and a resistor; said engagement portion has a slot extending in a direction orthogonal to the axial direction of said drive shaft; said drive shaft has at the forward end a flat plate-like projection formed on the center of rotation, so that said projection may be engaged with said slot; and said wiper contact is mounted in a position approximately orthogonal to the slot direction of said slot of said rotator.

5. The device according to claim 1, wherein the rotator is positioned in an inclined manner and the drive shaft is displaced in the vertical direction in such a manner that a flat plate projection of the drive shaft is sildably moved in the slot of the rotator.

6. The device according to claim 1, wherein the rotator is positioned in an inclined manner and the drive shaft is fixed in the slot of the rotator.

* * * * *